(12) United States Patent
Kitagawa et al.

(10) Patent No.: US 12,430,763 B2
(45) Date of Patent: Sep. 30, 2025

(54) COATING LAYER INSPECTION DEVICE AND METHOD FOR INSPECTING COATING LAYER

(71) Applicant: TERUMO KABUSHIKI KAISHA, Tokyo (JP)

(72) Inventors: Yuno Kitagawa, Kanagawa (JP); Yasuo Kurosaki, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 321 days.

(21) Appl. No.: 18/330,542

(22) Filed: Jun. 7, 2023

(65) Prior Publication Data

US 2023/0316519 A1 Oct. 5, 2023

Related U.S. Application Data (63) Continuation of application No. PCT/JP2022/005816, filed on Feb. 15, 2022.

(30) Foreign Application Priority Data

Feb. 15, 2021 (JP) ................................. 2021-021637

(51) Int. Cl.
G06T 7/00 (2017.01)
G06T 7/90 (2017.01)

(52) U.S. Cl.
CPC .............. G06T 7/0012 (2013.01); G06T 7/90 (2017.01); *G06T 2207/30021* (2013.01)

(58) Field of Classification Search
CPC ...................... G06T 7/0012; G06T 7/90; G06T 2207/30021; G06T 7/0004; G01N 21/88; G01N 21/952
See application file for complete search history.

(56) References Cited

U.S. PATENT DOCUMENTS

2016/0343122 A1* 11/2016 Jing ................... G01N 21/8851

FOREIGN PATENT DOCUMENTS

| JP | 2003222597 A | 8/2003 |
| JP | 2008249568 A | 10/2008 |

(Continued)

OTHER PUBLICATIONS

International Search Report (PCT/ISA/210) with translation and Written Opinion (PCT/ISA/237) mailed on Apr. 19, 2022, by the Japan Patent Office as the International Searching Authority for International Application No. PCT/JP2022/005816. (8 pages).

(Continued)

*Primary Examiner* — Christopher Wait
(74) *Attorney, Agent, or Firm* — Buchanan Ingersoll & Rooney PC (57) ABSTRACT

A coating layer inspection device and a method for inspecting a coating layer are disclosed that enable highly accurate evaluation of defectiveness in a coating layer of a subject. The coating layer inspection device includes a processing unit including a digitization unit that digitizes gray level information of each pixel, an average gray level calculation unit that calculates an average gray level, a first grayscale determination unit that determines whether the average gray level is equal to or greater than a first threshold and classifies the grayscale image as a potentially acceptable quality when obtaining an affirmative result, and a first upper-limit determination unit that determines whether the number of pixels having a gray level equal to or greater than the first threshold is equal to or less than a first specified upper limit and classifies the grayscale image as a potentially acceptable quality when obtaining an affirmative result.

20 Claims, 4 Drawing Sheets

(56) References Cited

FOREIGN PATENT DOCUMENTS

| JP | 2009008564 A | 1/2009 |
|---|---|---|
| JP | 2009109243 A | 5/2009 |
| JP | 2017187425 A | 10/2017 |

OTHER PUBLICATIONS

English Translations of the International Search Report (Form PCT/ISA/210) and the Written Opinion of the International Searching Authority (Form PCT/ISA/237) issued Apr. 19, 2022, by the Japan Patent Office in corresponding International Application No. PCT/JP2022/005816. (5 pages).

* cited by examiner

| P1 | P2 | P3 |
|----|----|----|
| P4 | P5 | P6 |
| P7 | P8 | P9 |

COATING LAYER INSPECTION DEVICE AND METHOD FOR INSPECTING COATING LAYER

CROSS-REFERENCES TO RELATED APPLICATIONS

This application is a continuation of International Application No. PCT/JP2022/005816 filed on Feb. 15, 2022, which claims priority to Japanese Application No. 2021-021637 filed on Feb. 15, 2021, the entire content of both of which is incorporated herein by reference.

TECHNOLOGICAL FIELD

The present disclosure generally relates to a coating layer inspection device for inspecting a coating layer formed on a surface of a subject and a method for inspecting a coating layer.

BACKGROUND DISCUSSION

In recent years, balloon catheters have been used to remedy a lesion (stenosis part) developed in a body lumen. A typical balloon catheter includes an elongated shaft and a radially inflatable balloon disposed in the distal side of the shaft. After a deflated balloon is brought to a target sight in the body through a thin body lumen, the balloon is inflated to push and expand a lesion.

However, forcibly expanding a lesion may excessively proliferate smooth muscle cells and may cause new stenosis (restenosis) in the lesion. For this reason, recent studies have been using a drug eluting balloon (DEB) having the surface coated with a drug for suppressing stenosis. The drug eluting balloon inflates to release the drug on its surface to a lesion, thereby helping prevent restenosis.

From perspectives of a releasing property and tissue transferability of a drug, it is preferable that a drug-containing coating layer should be disposed on a surface of a balloon in a desired amount and in a uniform manner. Furthermore, it is preferable that the coating layer should have a uniform crystalline form and a uniform distribution of crystal particles. Therefore, it is desirable to evaluate a condition of a coating layer formed.

For example, Japanese Patent Application Publication No. 2009-008564 A discloses a method for determining a foreign substance from a captured image of the appearance of a subject. In the method disclosed in Japanese Patent Application Publication No. 2009-008564 A, an area including the foreign substance is detected from a binary image obtained by capturing an image of a surface of a light transmissive material, and the area is differentiated twice, whereby the foreign surface is classified into a removable or non-removable substance depending on a detected edge distance.

With the device and method disclosed in Japanese Patent Application Publication No. 2009-008564 A, it is possible to discern a foreign substance in a subject, however, it is difficult to evaluate defectiveness in the overall subject with relatively high accuracy.

SUMMARY

The present disclosure provides a coating layer inspection device and a method for inspecting a coating layer enabling relatively highly accurate evaluation of defectiveness in a coating layer of a subject, for example, a balloon configured to be insertable into a body lumen.

A coating layer inspection device according to the disclosure is a device for inspecting a coating layer formed on a surface of a subject, the coating layer inspection device including: an image pickup unit configured to capture an image of the coating layer to create image data; and a processing unit configured to perform image processing, in which the processing unit includes a digitization unit configured to convert the image data into a grayscale image to digitize gray level information of each pixel in such a manner that a gray level increases from black to white, an area identification unit configured to identify an evaluation target area where the coating layer of the subject is formed, an average gray level calculation unit configured to calculate an average gray level of all pixels within the evaluation target area, a first grayscale determination unit configured to determine whether the average gray level is equal to or greater than a predetermined first threshold or greater than the first threshold and classifies the grayscale image as a potentially acceptable quality when obtaining an affirmative result, and a first upper-limit determination unit configured to determine whether the number of pixels having a gray level equal to or greater than the first threshold or the number of pixels having a gray level greater than the first threshold within the evaluation target area is equal to or less than a predetermined first specified upper limit or less than the first specified upper limit and classifies the grayscale image as a potentially acceptable quality when obtaining an affirmative result and determines the grayscale image as a rejectable quality when obtaining a negative result.

A method for inspecting a coating layer according to the disclosure is a method for inspecting a coating layer formed on a surface of a subject, the method involving: capturing an image of the coating layer to obtain image data; converting the image data into a grayscale image to digitize gray level information of each pixel in such a manner that a gray level increases from black to white; identifying an evaluation target area where the coating layer of the subject is formed; determining an average gray level of all pixels within the evaluation target area; determining whether the average gray level is equal to or greater than a predetermined first threshold or greater than the first threshold and classifying the grayscale image as a potentially acceptable quality when obtaining an affirmative result; and determining whether the number of pixels having a gray level equal to or greater than the first threshold or the number of pixels having a gray level greater than the first threshold within the evaluation target area is equal to or less than a predetermined first specified upper limit or less than the first specified upper limit and classifying the grayscale image as a potentially acceptable quality when obtaining an affirmative result and determining the grayscale image as a rejectable quality when obtaining a negative result.

In the coating layer inspection device having the above configuration, the first grayscale determination unit selects a subject shown in a white color of strong intensity and having a material of a coating layer in an amount determined to be equal to or greater than a predetermined acceptable amount, and the first upper-limit determination unit excludes a subject in which parts covered with too much material of the coating layer are scattered over a wide area. Since the coating layer inspection device evaluates defectiveness in a coating layer by more than one determinations, it is possible to evaluate defectiveness in a coating layer of a subject with high accuracy.

The coating layer inspection device may include a third upper-limit determination unit that determines whether the number of pixels having a gray level equal to or less than a predetermined third threshold or the number of pixels having a gray level less than the third threshold within the evaluation target area is equal to or less than a predetermined third specified upper limit or less than the third specified upper limit and classifies the grayscale image as a potentially acceptable quality when obtaining an affirmative result and determines the grayscale image as a rejectable quality when obtaining a negative result. Accordingly, in the coating layer inspection device, the third upper-limit determination unit excludes a subject in which parts covered with too little material of the coating layer are scattered over a wide area. Since the coating layer inspection device evaluates defectiveness in a coating layer by more than one determinations, it is possible to evaluate defectiveness in a coating layer of a subject with higher accuracy.

The coating layer inspection device may include a second grayscale determination unit that determines whether the average gray level is equal to or greater than a predetermined second threshold smaller than the first threshold or greater than the second threshold based on a negative result from the first grayscale determination unit and classifies the grayscale image as a potentially acceptable quality when obtaining an affirmative result and determines the grayscale image as a rejectable quality when obtaining a negative result, and a second upper-limit determination unit that determines whether the number of pixels having a gray level equal to or greater than the second threshold or the number of pixels having a gray level greater than the second threshold within the evaluation target area is equal to or less than a predetermined second specified upper limit or less than the second specified upper limit and classifies the grayscale image as a potentially acceptable quality when obtaining an affirmative result and determines the grayscale image as a rejectable quality when obtaining a negative result. Accordingly, in the inspection device, the second grayscale determination unit selects a subject shown in a white color of weak intensity but having the material of the coating layer in an amount determined to be equal to or greater than a predetermined acceptable amount, and the second upper-limit determination unit excludes a subject in which parts covered with too much material of the coating layer are scattered over a wide area. Therefore, the inspection device enables exclusion of a rejectable quality with high accuracy using a desired threshold and a specified value depending on an average gray level, thereby preventing an acceptable subject to be determined as a rejectable quality.

The coating layer inspection device may include a fourth upper-limit determination unit that determines whether the number of pixels having a gray level equal to or less than a predetermined fourth threshold or the number of pixels having a gray level less than the fourth threshold within the evaluation target area is equal to or less than a predetermined fourth specified upper limit or less than the fourth specified upper limit and classifies the grayscale image as a potentially acceptable quality when obtaining an affirmative result and determines the grayscale image as a rejectable quality when obtaining a negative result. Accordingly, in the inspection device, the fourth upper-limit determination unit excludes a subject in which parts covered with too little material of the coating layer are scattered over a wide area. Therefore, the inspection device enables exclusion of a rejectable quality with relatively high accuracy using a desired threshold and a specified value depending on an average gray level, thereby preventing an acceptable subject to be determined as a rejectable quality.

The coating layer inspection device may include a gray level difference determination unit that determines whether the number of pixels having a gray level difference with neighboring pixels equal to or greater than a predetermined gray level difference threshold or the number of pixels having a gray level difference greater than the gray level difference threshold within the evaluation target area is equal to or less than a predetermined specified gray level difference or less than the specified gray level difference and classifies the grayscale image as a potentially acceptable quality when obtaining an affirmative result and determines the grayscale image as a rejectable quality when obtaining a negative result. Accordingly, in the inspection device, the gray level difference determination unit excludes a subject determined to have the coating layer that varies locally and greatly. Therefore, the inspection device enables evaluation of defectiveness in a coating layer of a subject with higher accuracy.

The subject is a balloon insertable into a body lumen, and the coating layer may contain a drug. Accordingly, the inspection device enables evaluation of defectiveness in a drug-containing coating layer on a surface of a balloon with relatively high accuracy.

In the method for inspecting a coating layer with this configuration, a subject shown in a white color of strong intensity and having the material of the coating layer in an amount determined to be equal to or greater than a predetermined acceptable amount is selected by the first grayscale determination, and a subject in which parts covered with too much material of the coating layer are scattered over a wide area is excluded by the first upper-limit determination. Since the method for inspecting a coating layer evaluates defectiveness in a coating layer by more than one determination steps, it is possible to evaluate defectiveness in a coating layer of a subject with relatively high accuracy.

The method for inspecting a coating layer may involve a third upper-limit determination for determining whether the number of pixels having a gray level equal to or less than a predetermined third threshold or the number of pixels having a gray level less than the third threshold within the evaluation target area is equal to or less than a predetermined third specified upper limit or less than the third specified upper limit and classifying the grayscale image as a potentially acceptable quality when obtaining an affirmative result and determining the grayscale image as a rejectable quality when obtaining a negative result. Accordingly, in the method for inspecting a coating layer, a subject in which parts covered with too little material of the coating layer are scattered over a wide area is excluded by the third upper-limit determination. Since the method for inspecting a coating layer evaluates defectiveness in a coating layer by more than one determination steps, it is possible to evaluate defectiveness in a coating layer of a subject with relatively higher accuracy. Note that either the first upper-limit determination or the third upper-limit determination may be performed first.

The method for inspecting a coating layer may involve a second grayscale determination for determining whether the average gray level is equal to or greater than a predetermined second threshold smaller than the first threshold or greater than the second threshold based on a negative result in the first grayscale determination and classifying the grayscale image as a potentially acceptable quality when obtaining an affirmative result and determining the grayscale image as a rejectable quality when obtaining a negative result, and a second upper-limit determination for determining whether the number of pixels having a gray level equal to or greater than the second threshold or the number of pixels having a gray level greater than the second threshold within the evaluation target area is equal to or less than a predetermined second specified upper limit or less than the second specified upper limit and classifying the grayscale image as a potentially acceptable quality when obtaining an affirmative result and determining the grayscale image as a rejectable quality when obtaining a negative result. Accordingly, in the inspection method, a subject shown in a white color of weak intensity but having the material of the coating layer in an amount determined to be equal to or greater than a predetermined acceptable amount is selected by the second grayscale determination, and a subject in which parts covered with too much material of the coating layer are scattered over a wide area is excluded by the second upper-limit determination. Therefore, the inspection method enables exclusion of a rejectable quality with relatively high accuracy using a desired threshold and a specified value depending on an average gray level, thereby helping prevent an acceptable subject to be determined as a rejectable quality.

The method for inspecting a coating layer may involve a fourth upper-limit determination for determining whether the number of pixels having a gray level equal to or less than a fourth threshold or the number of pixels having a gray level less than the fourth threshold within the evaluation target area is equal to or less than a predetermined fourth specified upper limit or less than the fourth specified upper limit and classifying the grayscale image as a potentially acceptable quality when obtaining an affirmative result and determining the grayscale image as a rejectable quality when obtaining a negative result. Accordingly, in the inspection method, a subject in which parts covered with too little material of the coating layer are scattered over a wide area is excluded by the fourth upper-limit determination. Therefore, the inspection method enables exclusion of a rejectable quality with relatively high accuracy using a desired fourth specified upper limit depending on an average gray level, thereby helping prevent an acceptable subject to be determined as a rejectable quality.

The method for inspecting a coating layer may involve a gray level difference determination after the first grayscale determination for determining whether the number of pixels having a gray level difference with neighboring pixels equal to or greater than a predetermined gray level difference threshold or the number of pixels having a gray level difference greater than the gray level difference threshold within the evaluation target area is equal to or less than a predetermined specified gray level difference or less than the specified gray level difference and classifying the grayscale image as a potentially acceptable quality when obtaining an affirmative result and determining the grayscale image as a rejectable quality when obtaining a negative result. Accordingly, in the inspection method, a subject determined to have a coating layer that varies locally and greatly is excluded by the gray level difference determination. Therefore, the inspection method enables evaluation of defectiveness in a coating layer of a subject with relatively higher accuracy.

A method for inspecting a coating layer formed on a surface of a balloon, the balloon being configured to be inserted in a body lumen, the method comprising: capturing an image of the coating layer to obtain image data; converting the image data into a grayscale image to digitize gray level information of pixels; identifying an evaluation target area where the coating layer of the balloon is formed; determining an average gray level of pixels within the evaluation target area; and determining whether the average gray level is equal to or greater than a predetermined first threshold and classifying the grayscale image as a potentially acceptable quality when the average gray level is equal to or greater than the predetermined first threshold.

The subject can be, for example, a balloon insertable into a body lumen, and the coating layer may contain a drug. Accordingly, the inspection method enables relatively highly accurate evaluation of defectiveness in the drug-containing coating layer on the surface of the balloon.

BRIEF DESCRIPTION OF THE DRAWINGS

FIGS. 4A-4F are schematic views illustrating conditions of a coating layer of a balloon, in which

DETAILED DESCRIPTION

Set forth below with reference to the accompanying drawings is a detailed description of embodiments of a coating layer inspection device for inspecting a coating layer formed on a surface of a subject and a method for inspecting a coating layer. Note that dimensional ratios in the drawings may be exaggerated for illustration purpose and may differ from actual ratios. In this specification and the drawings, components having substantially the same function are denoted by the same reference numerals to omit repetitive details.

Figure 1:
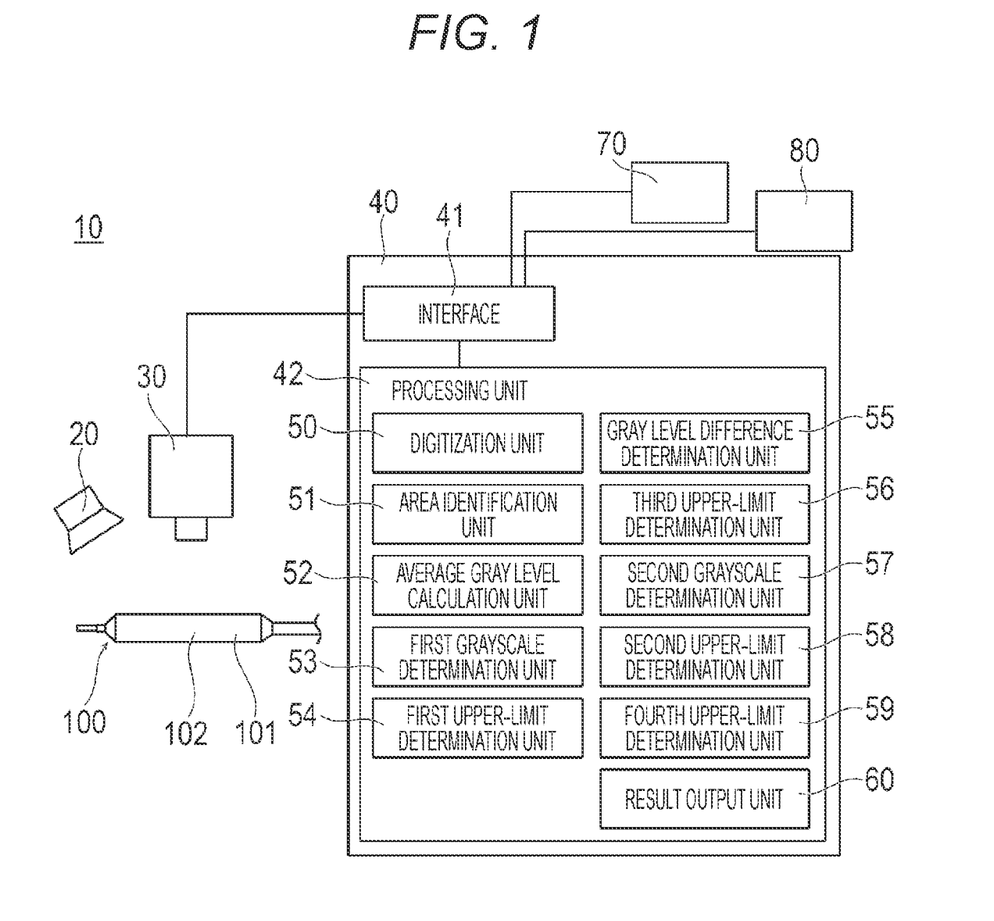
FIG. 1 is a block diagram of a coating layer inspection device according to an embodiment.
Figure 2:
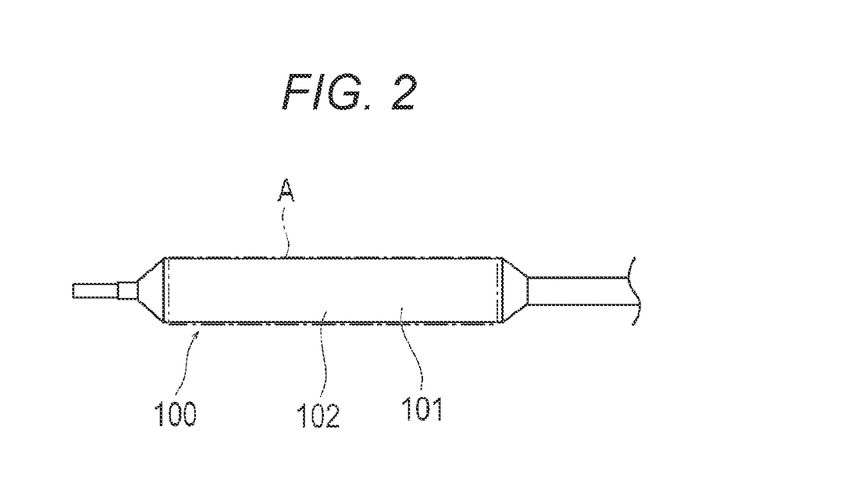
FIG. 2 is a front view of a balloon as a subject.

As illustrated in FIGS. 1 and 2, a coating layer inspection device 10 according to an embodiment of the disclosure is used to evaluate whether a coating layer 102 disposed on a surface of a balloon 101 of a drug eluting balloon catheter 100 is a good-quality product.

The surface of the balloon 101 can be relatively smooth and non-porous but the surface of the balloon may be porous. The balloon 101 can include a material having both flexibility and hardness to such an extent as to inflate when reaching a blood vessel or tissue and to release a drug from the coating layer 102 on the surface of the balloon 101. Specifically, at least the surface of the balloon 101 provided with the coating layer 102 preferably includes a plastic material. Examples of the plastic material used on the surface of the balloon 101 can include polyolefins such as polyethylene, polypropylene, polybutene, ethylene-propylene copolymer, ethylene-vinyl acetate copolymer, ionomer, and a mixture containing at least two of these polyolefins and thermoplastic resins such as soft polyvinyl chloride resin, polyamide, polyamide elastomer, nylon elastomer, polyester, polyester elastomer, polyurethane, and fluororesin and also include silicone rubber and latex rubber.

The coating layer 102 contains a drug. The coating layer 102 may also contain an additive. The drug can be, for example, preferably, but not limited to, a water-insoluble drug. For example, the coating layer 102 can include a plurality of minute drug crystal particles. The drug may have a crystalline form, an amorphous form, or both. Crystalline and amorphous substances may be arranged in the coating layer 102 regularly or irregularly. The crystalline form may be, but is not particularly limited to, for example, a unidirectionally elongated columnar form, flat plate form, or an irregular lump form.

Preferred examples of the water-insoluble drug can include immunosuppressants such as cyclosporines including cyclosporin, immunoactive drugs such as rapamycin, anticancer drugs such as paclitaxel, antiviral or antimicrobial drugs, antineoplastic drugs, analgesics and anti-inflammatory drugs, antibiotics, antiepileptic drugs, anxiolytics, antiparalytics, antagonists, neuron blocking drugs, anticholinergics and cholinergics, antimuscarinic drugs and muscarinic drugs, adrenolytics, antiarrhythmics, antihypertensives, hormonal drugs, and nutritional drugs.

The water-insoluble drug is preferably at least one selected from the group consisting of rapamycin, paclitaxel, docetaxel, and everolimus. Herein, rapamycin, paclitaxel, docetaxel, and everolimus include analogs and/or derivatives of rapamycin, paclitaxel, docetaxel and everolimus as long as they have similar efficacy. For example, paclitaxel and docetaxel are analogs. Everolimus is a derivative of rapamycin. Among these examples, paclitaxel may be more preferable.

Hereinafter described is the coating layer inspection device 10. The coating layer inspection device 10 can include a lighting device 20 that lights the balloon 101 as a subject, an image pickup unit 30 that captures an image of the lighted subject, creates image data, and transmits the image data by an electric signal, a processing device 40 that receives the image data from the image pickup unit 30, a display device 70 that shows a result evaluated by the processing device 40, and an input device 80 for inputting information to the processing device 40.

The lighting device 20 lights the subject. It is desirable that the lighting device 20 should uniformly light an evaluation target area A on the surface of the subject. An illuminance of 100 lx (lux) or more around the surface of the subject enables the evaluation, but the lighting device 20 preferably illuminates the surface of the subject with light having an illuminance of 1,000 lx to 200,000 lx and more preferably an illuminance of 20,000 lx to 40,000 lx from a perspective of uniform illumination. A light source of any type may be employed as long as it assures the above illuminance, and examples of the light source include an incandescent lamp, fluorescent lamp, halogen lamp, HID lamp, LED lamp, organic LE lamp, and HID halogen lamp. An HID halogen lamp is a collective term for a high-pressure mercury lamp and the like. Being higher in luminance than an incandescent lamp, HID halogen lamps are employed in vehicles and trains.

The image pickup unit 30 captures an image of the subject lighted by the lighting device 20, creates a digital image, and transmits the image to the processing device 40. The image pickup unit 30 can include, for example, a lens for forming an image by reflected light from the subject and a CCD camera that converts the formed image of the subject into an electric signal. A larger number of pixels can form boundaries between shades of color clearer and enhances the accuracy of evaluation. A camera, for example, having 200,000 pixels or more can enable the evaluation, but it is preferable to use a camera having 400,000 pixels to 10,000,000 pixels, and more preferably, 1,000,000 pixels to 5,000,000 pixels. A shutter speed of $1/15$ or more can enable the evaluation, but the speed is preferably $1/20$ to $1/100,000$, and more desirably $1/30$ to $1/100$.

The display device 70 receives a signal from the processing device 40 and can include, for example, a monitor for display. The display device 70 shows the image captured by the image pickup unit 30, an image subjected to image processing, and a result of the evaluation whether the subject is a good-quality product.

The input device 80 is used for inputting information to the processing device 40, and examples of the input device 80 can include a keyboard, mouse, storage medium, and connector connectable to another computer. A user can use the input device 80 to perform various operations.

The processing device 40 can include an interface 41 for capturing the electric signal as the image data from the image pickup unit 30 and a processing unit 42 for performing arithmetic processing. The processing device 40 can be, for example, a computer.

The processing unit 42 can include a memory circuit and an arithmetic circuit as physical components. The memory circuit stores programs and various parameters. The arithmetic circuit can be, for example, a central processing unit (CPU) and reads the programs and various parameters from the memory circuit and performs arithmetic processing and image preprocessing such as binarization, contrast adjustment, and noise control.

The processing unit 42 can include, as functional components, a digitization unit 50, an area identification unit 51, an average gray level calculation unit 52, a first grayscale determination unit 53, a first upper-limit determination unit 54, a gray level difference determination unit 55, and a third upper-limit determination unit 56. The processing unit 42 also can include a second grayscale determination unit 57, a second upper-limit determination unit 58, a fourth upper-limit determination unit 59, and a result output unit 60. With regard to the digitization unit 50, area identification unit 51, average gray level calculation unit 52, first grayscale determination unit 53, first upper-limit determination unit 54, gray level difference determination unit 55, third upper-limit determination unit 56, second grayscale determination unit 57, second upper-limit determination unit 58, fourth upper-limit determination unit 59, and result output unit 60, details will be described later together with an inspection method.

Figure 3:
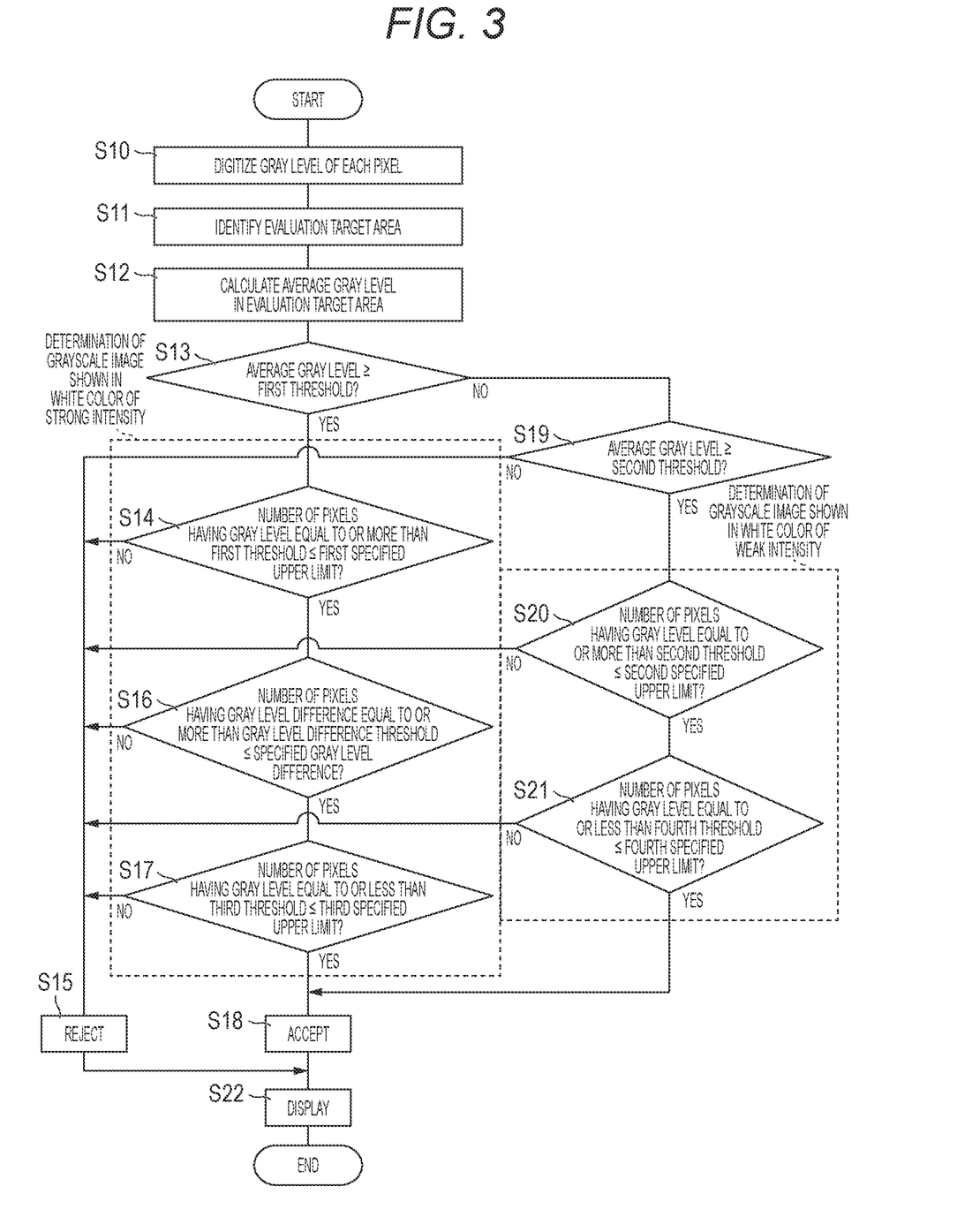
FIG. 3 is a flowchart illustrating the processing in a processing unit.

With reference to a flowchart of processing performed by the processing unit 42 illustrated in FIG. 3, hereinafter described is a method for inspecting a coating layer using the coating layer inspection device 10 according to the embodiment.

The image pickup unit 30 captures an image of the balloon 101, or the subject, lighted by the lighting device 20 and transmits the obtained digital image as an electric signal to the processing device 40. The electric signal of the digital image is transmitted to the interface 41 of the processing device 40. The interface 41 captures the electric signal from the image pickup unit 30 as image data.

Next, the processing unit 42 causes the digitization unit 50 to digitize gray level information of each pixel (S10). The digitization unit 50 converts the captured image data into a grayscale image. In the grayscale image, the brightness of each pixel is digitized, for example, by 256 gray levels ranging from 0 to 255. A pixel having a digitized gray level of 0 corresponds to black, and a pixel having a digitized gray level of 255 corresponds to white. The digitized gray level in each pixel is stored in a storage device. In a case where the subject is the balloon 101, a part provided with the drug-containing coating layer 102 reflects light strongly and is shown in a white color of relatively strong intensity. The gray level of this part approaches 255. In contrast, a part of the balloon 101 without the coating layer 102 is nearly transparent and hardly reflects light and is shown in a black color of strong intensity (white color of weak intensity). The gray level of this part approaches 0.

Next, the processing unit 42 causes the area identification unit 51 to identify from the grayscale image the evaluation target area A (see FIG. 2) where the coating layer 102 of the balloon 101, or the subject, is formed (S11). The grayscale image includes the evaluation target area A. When the position of balloon 101 relative to the image pickup unit 30 is substantially set, it is possible to fixedly set the evaluation target area A within the field of view of the image pickup unit 30. Note that a method for identifying the evaluation target area A is not particularly limited. For example, the evaluation target area A in the grayscale image may be separated from the background by comparing the digitized gray level in each pixel with an appropriate threshold. Alternatively, the evaluation target area A may be identified manually from the grayscale image shown on the display device 70.

Next, the processing unit 42 causes the average gray level calculation unit 52 to calculate an average gray level of all pixels within the evaluation target area A (S12). The average gray level is obtained by adding the gray levels of all the pixels within the evaluation target area A and dividing the sum by the number of pixels.

Figures 4A, 4B, 4C:
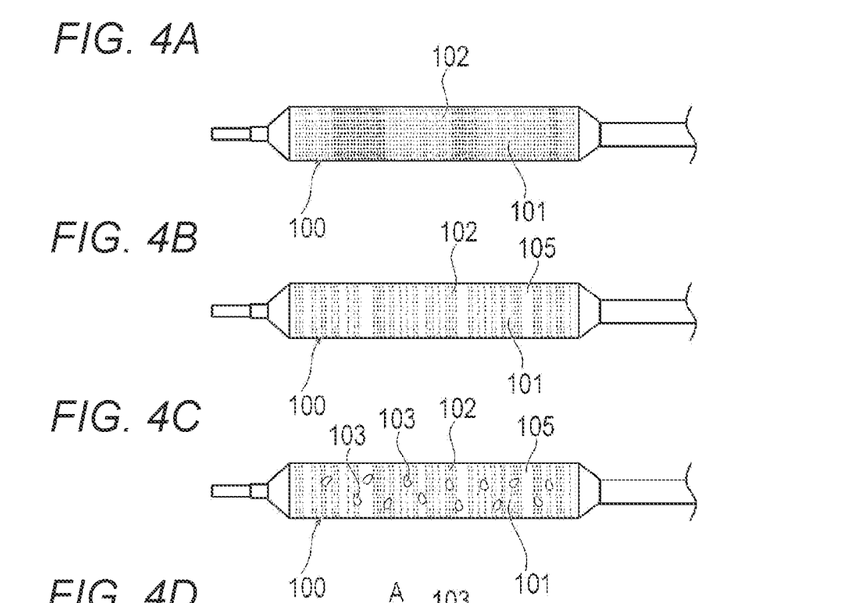
FIG. 4A shows a first example of a coating layer determined negatively by a first grayscale determination unit.
FIG. 4B shows a second example of a coating layer determined negatively by the first grayscale determination unit.
FIG. 4C shows a third example of a coating layer determined negatively by the first grayscale determination unit.

Next, the processing unit 42 causes the first grayscale determination unit 53 to determine whether the average gray level is equal to or greater than a predetermined first threshold (S13). Note that the first grayscale determination unit 53 may determine whether the average gray level is greater than the predetermined first threshold. The first threshold is a value greater than 0 and less than 255. The first threshold is determined by an experiment or the like as a threshold for determining whether an amount of material of the coating layer 102 as a whole on the surface of the balloon 101 is equal to or greater than a desired predetermined amount. Obtaining an affirmative result, the first grayscale determination unit 53 determines that the grayscale image has a gray level indicating a white color of strong intensity and that an amount of material of the coating layer 102 as a whole is equal to or greater than a predetermined amount, thereby classifying the grayscale image as a potentially acceptable quality. Obtaining a negative result, the first grayscale determination unit 53 determines that the grayscale image has a gray level indicating a white color of weak intensity and that an amount of material of the coating layer 102 as a whole does not meet the predetermined amount, thereby transferring the task of grayscale image determination to the second grayscale determination unit 57 to be described. Examples of conditions determined negatively by the first grayscale determination unit 53 include a condition where the crystalline form of the drug varies from place to place as illustrated in FIG. 4A, a condition where the drug is not sufficiently applied to the balloon 101 as illustrated in FIG. 4B, and a condition where the drug is not sufficiently applied to the balloon 101 and crystalline lumps 103 are scattered over a wide area as illustrated in FIG. 4C. As illustrated in FIGS. 4B and 4C, due to defectiveness in the coating layer 102, the balloon 101 can include an exposed portion 105, or a part without the coating layer 102, which is exposed on the surface of the balloon 101 itself. The balloon 101 can include both the exposed portion 105 and the crystalline lumps 103 or can include the exposed portion 105 but no crystalline lump 103.

Figures 4D, 4E, 4F:
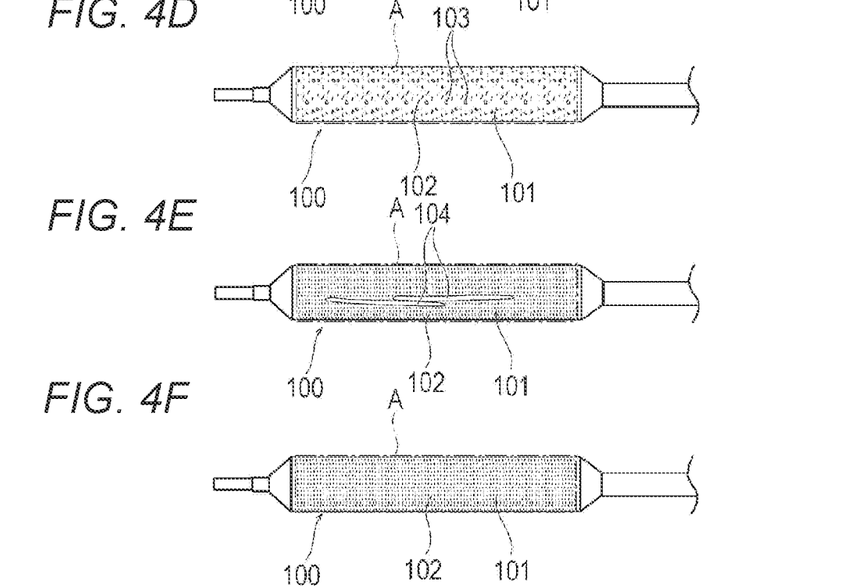
FIG. 4D shows a coating layer rejected by a first upper-limit determination unit.
FIG. 4E shows a coating layer rejected by a third upper-limit determination unit and a fourth upper-limit determination unit.
FIG. 4F shows an acceptable coating layer.

When the first grayscale determination unit 53 determines affirmatively that the average gray level is greater than the predetermined first threshold, the processing unit 42 causes the first upper-limit determination unit 54 to determine whether the number of pixels having a gray level equal to or greater than the first threshold (or the number of pixels having a gray level greater than the first threshold) within the evaluation target area A is equal to or less than a predetermined first specified upper limit (S14). Note that the first upper-limit determination unit 54 may determine whether the number of pixels having a gray level equal to or greater than the first threshold (or the number of pixels having a gray level greater than the first threshold) within the evaluation target area A is less than the predetermined first specified upper limit. The first upper-limit determination unit 54 determines whether parts covered with too much material of the coating layer 102 are scattered over a wide area on the surface of the balloon 101. Obtaining a negative result, the first upper-limit determination unit 54 determines that parts covered with too much material of the coating layer 102 are scattered over a relatively wide area on the surface of the balloon 101, thereby determining the grayscale image as a rejectable quality (S15). Next, the processing unit 42 causes the result output unit 60 to display the result on the display device 70 (S22) and ends the processing unit. Examples of conditions where parts covered with too much material of the coating layer 102 are scattered over a wide area on the surface of the balloon 101 include a condition where the crystalline lumps 103 are scattered over a wide area on the coating layer 102 as illustrated in FIG. 4D, a condition where the coating layer 102 has a crystalline form different from the desired form, and a condition where the surface of the coating layer 102 has irregularities. Obtaining an affirmative result, the first upper-limit determination unit 54 determines that parts covered with too much material of the coating layer 102 are not scattered over a relatively wide area on the surface of the balloon 101, thereby classifying the grayscale image as a potentially acceptable quality. Accordingly, the first specified upper limit is determined by an experiment or the like to enable determination by the first upper-limit determination unit 54.

Figure 5:
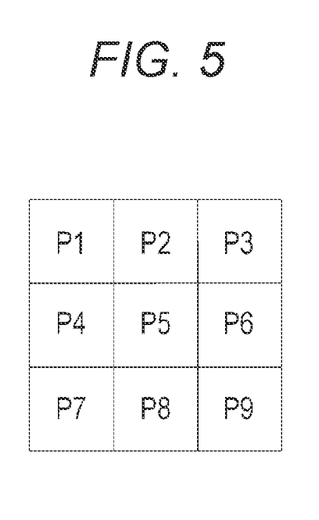
FIG. 5 is a plan view illustrating an example of a plurality of pixels arranged two-dimensionally.

When the first upper-limit determination unit 54 determines affirmatively that the number of pixels having gray level equal to or greater than first threshold is equal to or less than a predetermined first specified upper limit, the processing unit 42 causes the gray level difference determination unit 55 to determine whether the number of pixels having a gray level difference with neighboring pixels equal to or greater than a predetermined gray level difference threshold (or the number of pixels having a gray level difference greater than the gray level difference threshold) within the evaluation target area A is equal to or less than a predetermined specified gray level difference (S16). Note that the gray level difference determination unit 55 may determine whether the number of pixels having a gray level difference with neighboring pixels equal to or greater than the predetermined gray level difference threshold (or the number of pixels having a gray level difference greater than the gray level difference threshold) within the evaluation target area A is less than the predetermined specified gray level difference. Except for pixels disposed in outer edges, each pixel within the evaluation target area A has four neighboring pixels in vertical and horizontal directions. The pixels within the evaluation target area A which are disposed in the outer edges have three or two neighboring pixels in vertical and horizontal directions. A gray level difference with neighboring pixels in each pixel is defined as a difference between pixels that generate (or make) the biggest gray level difference obtained by comparing the gray level of each pixel and the gray levels of all the neighboring pixels. For example, when there are nine pixels Pi (i=1 to 9) as illustrated in FIG. 5, neighboring pixels of a pixel P5 are these four pixels: vertically neighboring pixels P2 and P8 and horizontally neighboring pixels P4 and P6. Each pixel Pi (i=1 to 9) has a gray level Ti (i=1 to 9). A gray level difference between the pixel P5 and the neighboring pixels is defined as the maximum value of |T5−T2|, |T5−T4|, |T5−T6|, and |T5−T8|. Alternatively, neighboring pixels of the pixel P5 may be defined as eight pixels neighboring in the vertical, horizontal, and diagonal directions (P1 to P4, P6 to P9). In this case, a gray level difference between the pixel P5 and neighboring pixels of the pixel P5 is defined as the maximum value of |T5−T1|, |T5−T2|, |T5−T3|, |T5−T4|, |T5−T6|, |T5−T7|, and |T5−T8|.

The gray level difference determination unit 55 determines whether the surface of the balloon 101 can include few parts with varying densities of material of the coating layer 102. Obtaining a negative result, the gray level difference determination unit 55 determines that parts with varying densities of material of the coating layer 102 are scattered over a wide area on the surface of the balloon 101, thereby determining the grayscale image as a rejectable quality (S15). Next, the processing unit 42 causes the result output unit 60 to display the result on the display device 70 (S22) and ends the processing unit. As similar to the conditions determined by the first upper-limit determination unit 54 where parts covered with too much material of the coating layer 102 are scattered over a wide area on the surface of the balloon 101, examples of conditions where parts with varying densities of material of the coating layer 102 are scattered over a wide area on the surface of the balloon 101 include a condition illustrated in FIG. 4D where the crystalline lumps 103 are scattered over a wide area on the coating layer 102, a condition where the coating layer 102 has a crystalline form different from the desired form, and a condition where the surface of the coating layer 102 has many irregularities. Obtaining an affirmative result, the gray level difference determination unit 55 determines that the surface of the balloon 101 includes few parts with varying densities of material of the coating layer 102 and classifies the grayscale image as a potentially acceptable quality. Accordingly, the specified gray level difference is determined by an experiment or the like to enable determination by the gray level difference determination unit 55.

When the gray level difference determination unit 55 determines affirmatively that the number of pixels having a gray level difference is equal to or greater than the gray level difference threshold, the processing unit 42 causes the third upper-limit determination unit 56 to determine whether the number of pixels having a gray level equal to or less than a third threshold (or the number of pixels having a gray level less than the third threshold) within the evaluation target area A is equal to or less than a predetermined third specified upper limit (S17). Note that the third upper-limit determination unit 56 may determine whether the number of pixels having a gray level equal to or less than the third threshold (or the number of pixels having a gray level less than the third threshold) within the evaluation target area A is less than the predetermined third specified upper limit. The third upper-limit determination unit 56 determines whether parts covered with too little material of the coating layer 102 are confined in a relatively narrow area on the surface of the balloon 101. Obtaining a negative result, the third upper-limit determination unit 56 determines that parts covered with too little material of the coating layer 102 are scattered over a relatively wide area on the surface of the balloon 101, thereby determining the grayscale image as a rejectable quality (S15). Next, the processing unit 42 causes the result output unit 60 to display the result on the display device 70 (S22) and ends the processing unit. Examples of conditions where parts covered with too little material of the coating layer 102 are scattered over a relatively wide area on the surface of the balloon 101 include a condition where a loss 104 is found in a wide area of the coating layer 102 as illustrated in FIG. 4E and a condition where the coating layer 102 includes a large foreign substance. Obtaining an affirmative result, the third upper-limit determination unit 56 determines that parts covered with too little material of the coating layer 102 are confined in a narrow area on the surface of the balloon 101 as illustrated in FIG. 4F, thereby determining the grayscale image as an acceptable quality (S18). Next, the processing unit 42 causes the result output unit 60 to display the result on the display device 70 (S22) and ends the processing unit.

When the first grayscale determination unit 53 determines negatively, the processing unit 42 causes the second grayscale determination unit 57 to determine whether the average gray level is equal to or greater than a predetermined second threshold (S19). Note that the second grayscale determination unit 57 may determine whether the average gray level is greater than the predetermined second threshold. The second threshold is a value greater than 0 and less than 255. The second threshold is less than (or smaller than) the first threshold. The second threshold is determined by an experiment or the like as a threshold for determining whether an amount of material of the coating layer 102 as a whole on the surface of the balloon 101 is equal to or greater than a desired predetermined amount but smaller than the amount determined to be affirmative by the first grayscale determination unit 53. Obtaining an affirmative result, the second grayscale determination unit 57 determines that the grayscale image has a gray level indicating a white color of relatively strong intensity but not as strong as the level determined to be affirmative in the first grayscale determination unit 53 and that an amount of material of the coating layer 102 as a whole is equal to or greater than the predetermined amount, thereby classifying the grayscale image as a potentially acceptable quality. Obtaining a negative result, the second grayscale determination unit 57 determines that an amount of material of the coating layer 102 as a whole does not meet the predetermined amount and determines the grayscale image as a rejectable quality (S15). As illustrated in FIG. 4B, in a case where the surface of the balloon 101 includes no exposed portion 105 nor crystalline lump 103, the determination in S19 is negative, and the grayscale image is determined as a rejectable quality (S15). Next, the processing unit 42 causes the result output unit 60 to display the result on the display device 70 (S22) and ends the processing unit.

When the second grayscale determination unit 57 determines affirmatively that the average gray level is greater than the predetermined second threshold, the processing unit 42 causes the second upper-limit determination unit 58 to determine whether the number of pixels having a gray level equal to or greater than the second threshold (or the number of pixels having a gray level greater than the second threshold) within the evaluation target area A is equal to or less than a predetermined second specified upper limit (S20). Note that the second upper-limit determination unit 58 may determine whether the number of pixels having a gray level equal to or greater than the second threshold (or the number of pixels having a gray level greater than the second threshold) within the evaluation target area A is less than the predetermined second specified upper limit. The second upper-limit determination unit 58 determines whether parts covered with too much material of the coating layer 102 are scattered over a wide area on the surface of the balloon 101. Obtaining a negative result, the second upper-limit determination unit 58 determines that parts covered with too much material of the coating layer 102 are scattered over a wide area on the surface of the balloon 101, thereby determining the grayscale image (S15). As illustrated in FIG. 4C, in a case where there are the exposed portion 105 and the crystalline lumps 103 on the surface of the balloon 101, the determination in S20 is negative, and the grayscale image is determined as a rejectable quality (S15). Next, the processing unit 42 causes the result output unit 60 to display the result on the display device 70 (S22) and ends the processing unit. Obtaining an affirmative result, the second upper-limit determination unit 58 determines that parts covered with too much material of the coating layer 102 are not scattered over a wide area on the surface of the balloon 101, thereby classifying the grayscale image as a potentially acceptable quality. Accordingly, the second specified upper limit is determined by an experiment or the like to enable determination by the second upper-limit determination unit 58. The second specified upper limit is different from the first specified upper limit but may be the same.

Note that the second upper-limit determination unit 58 is similar to the first upper-limit determination unit 54 that uses the first specified upper limit for determination (S14) except that the second upper-limit determination unit 58 uses the second specified upper limit (S20).

When the second upper-limit determination unit 58 determines affirmatively, the processing unit 42 causes the fourth upper-limit determination unit 59 to determine whether the number of pixels having a gray level equal to or less than a fourth threshold (or the number of pixels having a gray level less than the fourth threshold) within the evaluation target area A is equal to or less than the predetermined fourth specified upper limit (S21). Note that the fourth upper-limit determination unit 59 may determine whether the number of pixels having a gray level equal to or less than the fourth threshold (or the number of pixels having a gray level less than the fourth threshold) within the evaluation target area A is less than the predetermined fourth specified upper limit. The fourth upper-limit determination unit 59 determines whether parts covered with too little material of the coating layer 102 are confined in a narrow area on the surface of the balloon 101. Obtaining a negative result, the fourth upper-limit determination unit 59 determines that parts covered with too little material of the coating layer 102 are scattered over a wide area on the surface of the balloon 101, thereby determining the grayscale image as a rejectable quality (S15). Next, the processing unit 42 causes the result output unit 60 to display the result on the display device 70 (S22) and ends the processing unit. Obtaining an affirmative result, the fourth upper-limit determination unit 59 determines that parts covered with too little material of the coating layer 102 are confined in a narrow area on the surface of the balloon 101, thereby determining the grayscale image as an acceptable quality (S18). Next, the processing unit 42 causes the result output unit 60 to display the result on the display device 70 (S22) and ends the processing unit. Accordingly, the fourth specified upper limit is determined by an experiment or the like to enable determination by the fourth upper-limit determination unit 59.

The fourth upper-limit determination unit 59 determines (S21) in a manner similar to that of the third upper-limit determination unit 56 (S17), but note that specified values obtained by the fourth upper-limit determination unit 59 and the third upper-limit determination unit 56 may be the same or different.

Furthermore, the determination by the gray level difference determination unit 55 (S17) may be set between the determination by the second upper-limit determination unit 58 (S20) and the determination by the fourth upper-limit determination unit 59 (S21).

Steps or processes S14, S16, and S17 after the first grayscale determination unit 53 determined affirmatively (S13) are performed when the grayscale image is shown in a white color of strong intensity and determined to have a large amount of the coating layer 102. In contrast, S20 and S21 after the second grayscale determination unit 57 determined affirmatively (S19) are performed when the grayscale image is shown in a white color of weak intensity and determined to have a small amount of the coating layer 102. In this manner, according to a difference between shades of white color in the grayscale image, or depending on an amount of material of the coating layer 102, an appropriate specified value (first specified upper limit, specified gray level difference, third specified upper limit, or second specified upper limit) is selected and used. In this embodiment, the acceptance of the grayscale image is determined by two patterns, that is, an affirmative result determined by the first grayscale determination unit 53 using the first threshold (average gray level first threshold) and an affirmative result determined by the second grayscale determination unit 57 using the second threshold (average gray level second threshold). However, note that the grayscale image may be determined by preparing other thresholds that gradually decrease (third threshold, fourth threshold, fifth threshold, . . . , and N-th threshold) and by setting an appropriate specified value (specified upper limit or specified gray level difference) according to the coating layer 102 having an average gray level that meets each threshold. In each threshold pattern, the acceptance and rejection of the grayscale image may be determined by a using a specified upper limit similarly to S14 or S20, a using a specified gray level difference similarly to S16, or a using a specified upper limit similarly to S17 or S21. The number N of thresholds that decrease gradually is not particularly limited.

As described above, the coating layer inspection device 10 according to this embodiment is a device for inspecting the coating layer 102 formed on a surface of a subject, and the coating layer inspection device 10 includes the image pickup unit 30 that captures an image of the coating layer 102 to create image data, and the processing unit 42 that performs image processing. The processing unit 42 includes the digitization unit 50 that generates the image data into a grayscale image to digitize gray level information of each pixel in such a manner that a gray level increases from black to white, the area identification unit 51 that identifies the evaluation target area A where the coating layer 102 of the subject is formed, the average gray level calculation unit 52 that calculates an average gray level of all pixels within the evaluation target area A, the first grayscale determination unit 53 that determines whether the average gray level is equal to or greater than the predetermined first threshold or greater than the first threshold and classifies the grayscale image as a potentially acceptable quality when obtaining an affirmative result, and the first upper-limit determination unit 54 that determines whether the number of pixels having a gray level equal to or greater than the first threshold or the number of pixels having a gray level greater than the first threshold within the evaluation target area A is equal to or less than the predetermined first specified upper limit or less than the first specified upper limit and classifies the grayscale image as a potentially acceptable quality when obtaining an affirmative result and determines the grayscale image as a rejectable quality when obtaining a negative result.

In the coating layer inspection device 10 having the above configuration, the first grayscale determination unit 53 selects a subject shown in a white color of strong intensity and having a material of the coating layer 102 in an amount determined to be equal to or greater than a predetermined acceptable amount, and the first upper-limit determination unit 54 excludes a subject in which parts covered with too much material of the coating layer 102 are scattered over a wide area. Since the method for inspecting a coating layer evaluates defectiveness in the coating layer 102 by more than one determinations, it is possible to evaluate defectiveness in the coating layer 102 of a subject with high accuracy.

The coating layer inspection device 10 includes the third upper-limit determination unit 56 that determines whether the number of pixels having a gray level equal to or less than the predetermined third threshold or the number of pixels having a gray level below the third threshold within the evaluation target area A is equal to or less than the predetermined third specified upper limit or less than the third specified upper limit and classifies the grayscale image as a potentially acceptable quality when obtaining an affirmative result and determines the grayscale image as a rejectable quality when obtaining a negative result. In the coating layer inspection device 10, the third upper-limit determination unit 56 excludes a subject in which parts covered with too little material of the coating layer 102 are scattered over a wide area. Since the coating layer inspection device 10 evaluates defectiveness in the coating layer 102 by more than one determinations, it is possible to evaluate defectiveness in the coating layer 102 of a subject with higher accuracy.

The coating layer inspection device 10 includes the second grayscale determination unit 57 that determines whether the average gray level is equal to or greater than the predetermined second threshold smaller than the first threshold or greater than the second threshold based on a negative result from the first grayscale determination unit 53 and classifies the grayscale image as a potentially acceptable quality when obtaining an affirmative result and determines the grayscale image as a rejectable quality when obtaining a negative result, and the second upper-limit determination unit 58 that determines whether the number of pixels having a gray level equal to or greater than the second threshold or the number of pixels having a gray level greater than the second threshold within the evaluation target area A is equal to or less than the predetermined second specified upper limit or less than the second specified upper limit and classifies the grayscale image as a potentially acceptable quality when obtaining an affirmative result and determines the grayscale image as a rejectable quality when obtaining a negative result. Accordingly, in the inspection device, the second grayscale determination unit 57 selects a subject shown in a white color of weak intensity but having the material of the coating layer 102 in an amount determined to be equal to or greater than a predetermined acceptable amount, and the second upper-limit determination unit 58 excludes a subject in which parts covered with too much material of the coating layer 102 are scattered over a wide area. Therefore, the inspection device enables exclusion of a rejectable quality with high accuracy using a desired threshold and a specified value depending on an average gray level, thereby preventing an acceptable subject to be determined as a rejectable quality.

The coating layer inspection device 10 includes the fourth upper-limit determination unit 59 that determines whether the number of pixels having a gray level equal to or less than the predetermined fourth threshold or the number of pixels having a gray level less than the fourth threshold within the evaluation target area A is equal to or less than the predetermined fourth specified upper limit or less than the fourth specified upper limit and classifies the grayscale image as a potentially acceptable quality when obtaining an affirmative result and determines the grayscale image as a rejectable quality when obtaining a negative result. Accordingly, in the coating layer inspection device 10, the fourth upper-limit determination unit 59 excludes a subject in which parts covered with too little material of the coating layer 102 are scattered over a wide area. Therefore, the coating layer inspection device 10 enables exclusion of a rejectable quality with high accuracy using a desired threshold and a specified value depending on an average gray level, thereby preventing an acceptable subject to be determined as a rejectable quality.

The coating layer inspection device 10 includes the gray level difference determination unit 55 that determines whether the number of pixels having a gray level difference with neighboring pixels equal to or greater than the predetermined gray level difference threshold or the number of pixels having a gray level difference greater than the gray level difference threshold within the evaluation target area A is equal to or less than the predetermined specified gray level difference or less than the specified gray level difference and classifies the grayscale image as a potentially acceptable quality when obtaining an affirmative result and determines the grayscale image as a rejectable quality when obtaining a negative result. Accordingly, in the inspection device, the gray level difference determination unit 55 excludes a subject determined to have the coating layer 102 that varies locally and greatly. Therefore, the inspection device enables evaluation of defectiveness in the coating layer 102 of a subject with higher accuracy.

The subject is the balloon 101 insertable into a body lumen, and the coating layer 102 may contain a drug. Accordingly, the inspection device enables highly accurate evaluation of defectiveness in the drug-containing coating layer 102 on the surface of the balloon 101.

The method for inspecting a coating layer according to this embodiment is for inspecting the coating layer 102 formed on a surface of a subject. The method involves a of capturing an image of the coating layer 102 to obtain image data, S10 of generating the image data into a grayscale image to digitize gray level information of each pixel in such a manner that a gray level increases from black to white, S11 of identifying the evaluation target area A where the coating layer 102 of the subject is formed, S12 of determining an average gray level of all pixels within the evaluation target area A, S13 of first grayscale determination for determining whether the average gray level is equal to or greater than the predetermined first threshold or greater than the first threshold and classifying the grayscale image as a potentially acceptable quality when obtaining an affirmative result, and S14 of first upper-limit determination for determining whether the number of pixels having a gray level equal to or greater than the first threshold or the number of pixels having a gray level greater than the first threshold within the evaluation target area A is equal to or less than the predetermined first specified upper limit or less than the first specified upper limit and classifying the grayscale image as a potentially acceptable quality when obtaining an affirmative result and determining the grayscale image as a rejectable quality when obtaining a negative result.

In the method for inspecting a coating layer with this configuration, a subject shown in a white color of strong intensity and having the material of the coating layer 102 in an amount determined to be equal to or greater than a predetermined acceptable amount is selected by S13 of first grayscale determination, and a subject in which parts covered with too much material of the coating layer 102 are scattered over a wide area is excluded by S14 of first upper-limit determination. Since the method for inspecting a coating layer evaluates defectiveness in the coating layer 102 by more than one determination steps, it is possible to evaluate defectiveness in the coating layer 102 of a subject with high accuracy.

The method for inspecting a coating layer involves S17 of third upper-limit determination of determining whether the number of pixels having a gray level equal to or less than the predetermined third threshold or the number of pixels having a gray level less than the third threshold within the evaluation target area A is equal to or less than the predetermined third specified upper limit or less than the third specified upper limit and classifying the grayscale image as a potentially acceptable quality when obtaining an affirmative result and determining the grayscale image as a rejectable quality when obtaining a negative result. Accordingly, in the method for inspecting a coating layer, a subject in which parts covered with too little material of the coating layer 102 are scattered over a wide area is excluded by S17 of third upper-limit determination. Since the method for inspecting a coating layer evaluates defectiveness in the coating layer 102 by more than one determination steps, it is possible to evaluate defectiveness in the coating layer 102 of a subject with high accuracy. Note that either S14 of first upper-limit determination or S17 of third upper-limit determination may be performed first.

The method for inspecting a coating layer may also involve S19 of second grayscale determination for determining whether the average gray level is equal to or greater than the predetermined second threshold smaller than the first threshold or greater than the second threshold based on a negative result in S13 of first grayscale determination and classifying the grayscale image as a potentially acceptable quality when obtaining an affirmative result and determining the grayscale image as a rejectable quality when obtaining a negative result, and S20 of second upper-limit determination for determining whether the number of pixels having a gray level equal to or greater than the second threshold or the number of pixels having a gray level greater than the second threshold within the evaluation target area A is equal to or less than the predetermined second specified upper limit or less than the second specified upper limit and classifying the grayscale image as a potentially acceptable quality when obtaining an affirmative result and determining the grayscale image as a rejectable quality when obtaining a negative result. Accordingly, in the inspection method, a subject shown in a white color of weak intensity but having the material of the coating layer 102 in an amount determined to be equal to or greater than a predetermined acceptable amount is selected by the of second grayscale determination, and a subject in which parts covered with too much material of the coating layer 102 are scattered over a wide area is excluded by the of second upper-limit determination. Therefore, the inspection method enables exclusion of a rejectable quality with high accuracy using a desired threshold and a specified value depending on an average gray level, thereby helping prevent an acceptable subject to be determined as a rejectable quality.

The method for inspecting a coating layer may involve S21 of fourth upper-limit determination for determining whether the number of pixels having a gray level equal to or less than the predetermined fourth threshold or the number of pixels having a gray level less than the fourth threshold within the evaluation target area A is equal to or less than a predetermined fourth specified upper limit or less than the fourth specified upper limit and classifying the grayscale image as a potentially acceptable quality when obtaining an affirmative result and determining the grayscale image as a rejectable quality when obtaining a negative result. Accordingly, in the inspection method, a subject in which parts covered with too little material of the coating layer 102 are scattered over a wide area is excluded by the S21 of fourth upper-limit determination. Therefore, the inspection method enables exclusion of a rejectable quality with high accuracy using a desired fourth specified upper limit depending on an average gray level, thereby preventing an acceptable subject to be determined as a rejectable quality.

The method for inspecting a coating layer may involve S16 of gray level difference determination after S13 of first grayscale determination for determining whether the number of pixels having a gray level difference with neighboring pixels equal to or greater than the predetermined gray level difference threshold or the number of pixels having a gray level difference greater than the gray level difference threshold within the evaluation target area A is equal to or less than the predetermined specified gray level difference or less than the specified gray level difference and classifying the grayscale image as a potentially acceptable quality when obtaining an affirmative result and determining the grayscale image as a rejectable quality when obtaining a negative result. Accordingly, in the inspection method, a subject determined to have the coating layer 102 that varies locally and greatly is excluded by S16 of gray level difference determination. Therefore, the inspection method enables evaluation of defectiveness in the coating layer 102 of a subject with relatively higher accuracy.

The disclosure is not limited to the above embodiment, and various modifications may be made within the technical idea of the disclosure by those skilled in the art. For example, a subject to be inspected by the coating layer inspection device 10 is not limited to the balloon 101. The subject may be, for example, medical devices such as the balloon 101, a stent, a catheter, a guidewire, and an endoscope but may be non-medical devices. A coating layer on the subject may be, for example, a layer formed by a drug, a layer formed by a low friction material (such as fluorine-based resin) for improving abrasion resistance, a layer formed by hydrophilic polymers, and a layer formed by polymers for preventing thrombus adhesion. More specifically, for example, the subject may be a catheter including a hydrophilic coating layer as the coating layer, a guidewire including a polymer coating for preventing thrombus adhesion as the coating layer, a guidewire or an endoscope having PTFE coating or PEEK coating for improving abrasion resistance as the coating layer.

Even when the coating layer 102 is transparent, it is possible to perform the inspection by devising a way to light the coating layer 102 with the lighting device 20 or by pretreatment of the coating layer 102 or preprocessing of the captured image. With regard to the devised way of lighting, for example, in a case where the surface of the coating layer 102 includes irregularities, the coating layer 102 may be lit from a direction intersecting with (or perpendicular to) the direction in which the image pickup unit 30 captures an image. Accordingly, shadows having different sizes and patterns depending on a form of the coating layer 102 are shown in the grayscale image, and the inspection method using the grayscale image is feasible. The number of lighting devices is not necessarily one. Lighting with a plurality of lighting devices makes it possible to show shadows having different sizes and patterns in the grayscale image depending on a form of the coating layer 102, and the inspection method using the grayscale image is feasible. When using a plurality of lighting devices, the lighting devices may be of the same or different type. Examples of the pretreatment and preprocessing include a destructive approach such as coloring of the coating layer 102 to make a difference of shades in the transparent coating layer 102 visible and a non-destructive approach such as binarization and contrast adjustment of the captured image and noise control to make a difference of shades visible.

The detailed description above describes embodiments of a coating layer inspection device for inspecting a coating layer formed on a surface of a subject and a method for inspecting a coating layer. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A coating layer inspection device for inspecting a coating layer formed on a surface of a subject, the coating layer inspection device comprising:
   an image pickup unit configured to capture an image of the coating layer to create image data; and
   a processing unit configured to perform image processing, the processing unit including:
      a digitization unit configured to convert the image data into a grayscale image to digitize gray level information of each pixel in such a manner that a gray level increases from black to white;
      an area identification unit configured to identify an evaluation target area where the coating layer of the subject is formed;
      an average gray level calculation unit configured to calculate an average gray level of all pixels within the evaluation target area;
      a first grayscale determination unit configured to determine whether the average gray level is equal to or greater than a predetermined first threshold and to classify the grayscale image as a potentially acceptable quality when the average gray level is equal to or greater than the predetermined first threshold; and
      a first upper-limit determination unit configured to determine whether the number of pixels having a gray level equal to or greater than the predetermined first threshold within the evaluation target area is equal to or less than a predetermined first specified upper limit and to classify the grayscale image as a potentially acceptable quality when the number of pixels having the gray level equal to or greater than the predetermined first threshold within the evaluation target area is equal to or less than predetermined first specified upper limit, and to determine the grayscale image as a rejectable quality when the number of pixels having the gray level greater than the predetermined first threshold within the evaluation target area is greater than the predetermined first specified upper limit.

2. The coating layer inspection device according to claim 1, further comprising:
   a third upper-limit determination unit configured to determine whether the number of pixels having a gray level equal to or less than a predetermined third threshold within the evaluation target area is equal to or less than a predetermined third specified upper limit and to classify the grayscale image as a potentially acceptable quality when the number of pixels having the gray level equal to or less than the predetermined third threshold within the evaluation target area is equal to or less than the predetermined third specified upper limit and to determine the grayscale image as a rejectable quality when the number of pixels having the gray level pixels having the gray level equal to or less than the predetermined third threshold within the evaluation target area is greater than the predetermined third specified upper limit.

3. The coating layer inspection device according to claim 1, further comprising:
   a second grayscale determination unit configured to determine whether the average gray level is equal to or greater than a predetermined second threshold, the predetermined second threshold being less than the first threshold based on a negative result from the first grayscale determination unit and to classify the grayscale image as a potentially acceptable quality when the average gray level is equal to or greater than the predetermined second threshold and to determine the grayscale image as a rejectable quality when the average gray level is less than the predetermined second threshold; and
   a second upper-limit determination unit configured to determine whether the number of pixels having a gray level equal to or greater than the second threshold within the evaluation target area is equal to or less than a predetermined second specified upper limit and to classify the grayscale image as a potentially acceptable quality when the number of pixels having the gray level equal to or greater than the second threshold within the evaluation target area is equal to or less than a predetermined second specified upper limit and to determine the grayscale image as a rejectable quality when the number of pixels having a gray level equal to or greater than the second threshold within the evaluation target area is greater than a predetermined second specified upper limit.

4. The coating layer inspection device according to claim 3, further comprising:
   a fourth upper-limit determination unit configured to determine whether the number of pixels having a gray level equal to or less than a predetermined fourth threshold within the evaluation target area is equal to or less than a predetermined fourth specified upper limit and to classify the grayscale image as a potentially acceptable quality when the number of pixels having a gray level equal to or less than the predetermined fourth threshold within the evaluation target area is equal to or less than the predetermined fourth specified upper limit, and to determine the grayscale image as a rejectable quality when the number of pixels having the gray level equal to or less than the predetermined fourth threshold within the evaluation target area is greater than a predetermined fourth specified upper limit.

5. The coating layer inspection device according to claim 1, further comprising:
a gray level difference determination unit configured to determine whether the number of pixels having a gray level difference with neighboring pixels equal to or greater than a predetermined gray level difference threshold within the evaluation target area is equal to or less than a predetermined specified gray level difference and to classify the grayscale image as a potentially acceptable quality when the number of pixels having the gray level difference with neighboring pixels equal to or greater than the predetermined gray level difference threshold within the evaluation target area is equal to or less than a predetermined specified gray level difference, and to determine the grayscale image as a rejectable quality when the number of pixels having the gray level difference with neighboring pixels equal to or greater than the predetermined gray level difference threshold within the evaluation target area is greater than a predetermined specified gray level difference.

6. The coating layer inspection device according to claim 1, wherein the subject is a balloon insertable into a body lumen, and the coating layer contains a drug.

7. A method for inspecting a coating layer formed on a surface of a subject, the method comprising:
capturing an image of the coating layer to obtain image data;
converting the image data into a grayscale image to digitize gray level information of each pixel in such a manner that a gray level increases from black to white;
identifying an evaluation target area where the coating layer of the subject is formed;
determining an average gray level of all pixels within the evaluation target area;
determining whether the average gray level is equal to or greater than a predetermined first threshold and classifying the grayscale image as a potentially acceptable quality when the average gray level is equal to or greater than the predetermined first threshold; and
determining whether the number of pixels having a gray level equal to or greater than the first threshold within the evaluation target area is equal to or less than a predetermined first specified upper limit and to classify the grayscale image as a potentially acceptable quality when the number of pixels having the gray level equal to or greater than the first threshold within the evaluation target area is equal to or less than the predetermined first specified upper limit and determining the grayscale image as a rejectable quality when the number of pixels having the gray level equal to or greater than the first threshold within the evaluation target area is greater than the predetermined first specified upper limit.

8. The method for inspecting the coating layer according to claim 7, further comprising:
determining whether the number of pixels having a gray level equal to or less than a predetermined third threshold within the evaluation target area is equal to or less than a predetermined third specified upper limit and classifying the grayscale image as a potentially acceptable quality when the number of pixels having the gray level equal to or less than a predetermined third threshold within the evaluation target area is equal to or less than the predetermined third specified upper limit and determining the grayscale image as a rejectable quality when the number of pixels having the gray level equal to or less than the predetermined third threshold within the evaluation target area is greater than the predetermined third specified upper limit.

9. The method for inspecting the coating layer according to claim 7, further comprising:
determining whether the average gray level is equal to or greater than a predetermined second threshold, the predetermined second threshold being less than the first threshold based on a negative result in the of first grayscale determination and classifying the grayscale image as a potentially acceptable quality when the average gray level is equal to or greater than the predetermined second threshold, and determining the grayscale image as a rejectable quality when the average gray level is less than the predetermined second threshold; and
determining whether the number of pixels having a gray level equal to or greater than the second threshold within the evaluation target area is equal to or less than a predetermined second specified upper limit and classifying the grayscale image as a potentially acceptable quality when obtaining the number of pixels having the gray level equal to or greater than the second threshold within the evaluation target area is equal to or less than the predetermined second specified upper limit, and determining the grayscale image as a rejectable quality when the number of pixels having the gray level equal to or greater than the second threshold within the evaluation target area is greater than the predetermined second specified upper limit.

10. The method for inspecting the coating layer according to claim 9, further comprising:
determining whether the number of pixels having a gray level equal to or less than a predetermined fourth threshold within the evaluation target area is equal to or less than a predetermined fourth specified upper limit and classifying the grayscale image as a potentially acceptable quality when the gray level equal to or less than the predetermined fourth threshold within the evaluation target area is equal to or less than the predetermined fourth specified upper limit, and determining the grayscale image as a rejectable quality when the gray level equal to or less than the predetermined fourth threshold within the evaluation target area is greater than the predetermined fourth specified upper limit.

11. The method for inspecting the coating layer according to claim 7, further comprising:
determining whether the number of pixels having a gray level difference with neighboring pixels equal to or greater than a predetermined gray level difference threshold within the evaluation target area is equal to or less than a predetermined specified gray level difference and classifying the grayscale image as a potentially acceptable quality when the number of pixels having the gray level difference with neighboring pixels equal to or greater than the predetermined gray level difference threshold within the evaluation target area is equal to or less than the predetermined specified gray level difference and determining the grayscale image as a rejectable quality when the number of pixels having the gray level difference with neighboring pixels equal to or greater than the predetermined gray level difference threshold within the evaluation target area is greater than the predetermined specified gray level difference.

12. The method for inspecting the coating layer according to claim 7, wherein the subject is a balloon insertable into a body lumen, and the coating layer contains a drug.

13. A method for inspecting a coating layer formed on a surface of a balloon, the balloon being configured to be inserted in a body lumen, the method comprising:
 capturing an image of the coating layer to obtain image data;
 converting the image data into a grayscale image to digitize gray level information of pixels;
 identifying an evaluation target area where the coating layer of the balloon is formed;
 determining an average gray level of pixels within the evaluation target area; and
 determining whether the average gray level is equal to or greater than a predetermined first threshold and classifying the grayscale image as a potentially acceptable quality when the average gray level is equal to or greater than the predetermined first threshold.

14. The method for inspecting the coating layer according to claim 13, further comprising:
 determining whether the number of pixels having a gray level equal to or greater than the first threshold within the evaluation target area is equal to or less than a predetermined first specified upper limit;
 classifying the grayscale image as a potentially acceptable quality when the number of pixels having the gray level equal to or greater than the first threshold within the evaluation target area is equal to or less than the predetermined first specified upper limit; and
 classifying the grayscale image as a rejectable quality when the number of pixels having the gray level equal to or greater than the first threshold within the evaluation target area is greater than the predetermined first specified upper limit.

15. The method for inspecting the coating layer according to claim 14, further comprising:
 determining whether the number of pixels having a gray level equal to or less than a predetermined third threshold within the evaluation target area is equal to or less than a predetermined third specified upper limit and classifying the grayscale image as a potentially acceptable quality when the number of pixels having the gray level equal to or less than a predetermined third threshold within the evaluation target area is equal to or less than the predetermined third specified upper limit; and
 determining the grayscale image as a rejectable quality when the number of pixels having the gray level equal to or less than the predetermined third threshold within the evaluation target area is greater than the predetermined third specified upper limit.

16. The method for inspecting the coating layer according to claim 14, further comprising:
 determining whether the average gray level is equal to or greater than a predetermined second threshold, the predetermined second threshold being less than the first threshold based on a negative result in the of first grayscale determination; and
 classifying the grayscale image as a potentially acceptable quality when the average gray level is equal to or greater than the predetermined second threshold, and determining the grayscale image as a rejectable quality when the average gray level is less than the predetermined second threshold.

17. The method for inspecting the coating layer according to claim 16, further comprising:
 determining whether the number of pixels having a gray level equal to or greater than the second threshold within the evaluation target area is equal to or less than a predetermined second specified upper limit; and
 classifying the grayscale image as a potentially acceptable quality when obtaining the number of pixels having the gray level equal to or greater than the second threshold within the evaluation target area is equal to or less than the predetermined second specified upper limit; and
 determining the grayscale image as a rejectable quality when the number of pixels having the gray level equal to or greater than the second threshold within the evaluation target area is greater than the predetermined second specified upper limit.

18. The method for inspecting the coating layer according to claim 17, further comprising:
 determining whether the number of pixels having a gray level equal to or less than a predetermined fourth threshold within the evaluation target area is equal to or less than a predetermined fourth specified upper limit;
 classifying the grayscale image as a potentially acceptable quality when the gray level equal to or less than the predetermined fourth threshold within the evaluation target area is equal to or less than the predetermined fourth specified upper limit; and
 determining the grayscale image as a rejectable quality when the gray level equal to or less than the predetermined fourth threshold within the evaluation target area is greater than the predetermined fourth specified upper limit.

19. The method for inspecting the coating layer according to claim 14, further comprising:
 determining whether the number of pixels having a gray level difference with neighboring pixels equal to or greater than a predetermined gray level difference threshold within the evaluation target area is equal to or less than a predetermined specified gray level difference;
 classifying the grayscale image as a potentially acceptable quality when the number of pixels having the gray level difference with neighboring pixels equal to or greater than the predetermined gray level difference threshold within the evaluation target area is equal to or less than the predetermined specified gray level difference; and
 determining the grayscale image as a rejectable quality when the number of pixels having the gray level difference with neighboring pixels equal to or greater than the predetermined gray level difference threshold within the evaluation target area is greater than the predetermined specified gray level difference.

20. The method for inspecting the coating layer according to claim 14, wherein the coating layer includes a water-insoluble drug having a plurality of drug crystal particles.

* * * * *